INTEGRAL GRID AND MULTICHANNEL FIELD EFFECT DEVICES

Filed July 24, 1964 3 Sheets-Sheet 1

INVENTOR
STANISLAS TESZNER
BY
Abraham A. Saffitz
ATTORNEY

INVENTOR
STANISLAS TESZNER
BY
Abraham A. Saffitz
ATTORNEY

March 5, 1968 S. TESZNER 3,372,316

INTEGRAL GRID AND MULTICHANNEL FIELD EFFECT DEVICES

Filed July 24, 1964 3 Sheets-Sheet 3

INVENTOR
STANISLAS TESZNER
BY
Abraham A. Saffitz
ATTORNEY 3,372,316
INTEGRAL GRID AND MULTICHANNEL FIELD EFFECT DEVICES
Stanislas Teszner, 49 Rue de la Tour, Paris, France
Filed July 24, 1964, Ser. No. 385,023
Claims priority, application France, July 26, 1963, 942,896
3 Claims. (Cl. 317—235)

This invention relates to integral grid and integral channel semiconductor devices using the centripetal electric field effect. More specifically the invention is concerned with improvements to semiconductor devices of the kind described in my copending patent application Ser. No. 243,793 filed Dec. 11, 1962 which issued on Sept. 20, 1966 as U.S. Patent No. 3,274,461.

In my prior specification is described a device in the form of a semiconductive wafer of a given type of conductivity and having embedded in it a grid of the opposite type of conductivity, so that rods or teeth extend through the grid meshes to form, between terminal electrodes welded to the major surfaces of the wafer, a large number of conductive channels perpendicular to such surfaces. The grid thickness determines the channel length and the transverse dimensions of each mesh of the grid are such that a centripetal field effect "pinch-off" can be produced by a potential difference between the grid and whichever of the terminal electrodes forms a source electrode.

This device, which has been given the name of "gridistor" and which will be referred to by that name hereinafter, is in its general form a voltage and power amplifying triode with characteristics similar to a high-vacuum pentode valve. It has a very high transconductance per unit of surface area, with the advantage inter alia, that it can provide very high merit factors and can operate at high frequencies.

Unfortunately, the manufacturing process for this structure is fairly complicated, since what is basically required is either a double or triple diffusion of impurities of alternately opposite kinds of conductivity in a semiconductive wafer, or a diffusion of the grid followed by epitaxial growth deposition of a semiconductive layer which inter-connects the apices of all the channels and forms one of the terminal electrodes.

An object of this invention is the provision of an improved method of manufacturing a gridistor which retains the main advantages of the gridistor described in my prior specification, that is to say a high merit factor and the ability to operate at high frequencies.

More precisely, the object of the invention is to provide gridistor semiconductor devices by a single diffusion operation through and partially beneath a perforated mask. This kind of diffusion is sometimes called lateral diffusion.

A semiconductor device in accordance with one aspect of the invention comprises a thin semiconductive layer of a given type of conductivity with one exposed surface and one surface common with a semiconductive wafer of the opposite type of conductivity and forming a plane junction therewith, said layer having inclusions of the opposite type of conductivity which are contiguous with one another on their surface and with the said common surface, the inclusions forming a grid having a single row of meshes through which channels parallel with the said common surface extend. Another feature of the semiconductor devices according to the invention is that they can be manufactured by a single diffusion operation through the exposed surface of the said thin layer after the same has first been partly covered by an appropriate mask. In a preferred embodiment, the channels are disposed star-fashion between a central electrode and a peripheral electrode. In a variant, this basic structure is reproduced concentrically so that the resultant structure comprises, for instance, two grids connected to one electrode and three other electrodes which are insulated by construction.

A study of the following description and accompanying drawings which show examples of the invention will make these features and the advantages of the invention more clearly apparent. In the drawings.

Figure 1:
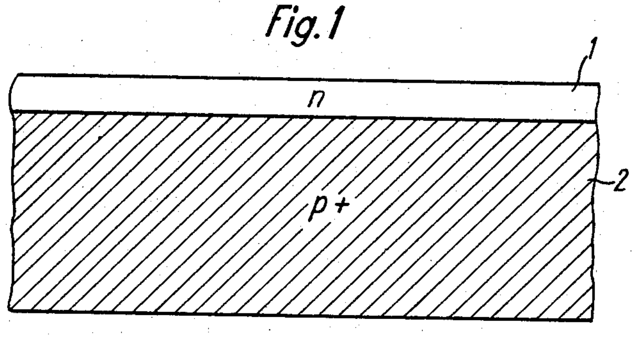
FIG. 1 shows a semiconductive wafer serving as the base material for the manufacture of a gridistor according to the invention.

FIG. 1 is a vertical section through a semiconductive wafer which can be, for instance, of silicon or germanium or of an intermetallic compound from groups III and V of the periodic system (in the following it will be assumed to be of silicon); the wafer comprises a low-resistivity base 2 of one type of conductivity, for instance, a $p^+$ type base having a resistivity of about 0.1 ohm. cm. and a relatively high resistivity surface layer 1 of the opposite type of conductivity, for instance, a n-type layer having a resistivity of about 10 ohm. cms. The layer 1 is of reduced thickness—e.g., some 5 to 15$\mu$—but the greater thickness of the base 2 is governed solely by mechanical considerations (for instance 150$\mu$). A diode of this kind forming the basic material of the device according to the invention can be prepared either by the process of drawing a crystal from a molten semiconductor bath, with reversal of the type of conductivity during drawing, or by deep diffusion of the $p^+$-type layer into an n-type substrate from the face opposite the surface layer, or—and preferably—by epitaxial deposition of an n-type layer on a $p^+$-type support.

Figure 2:
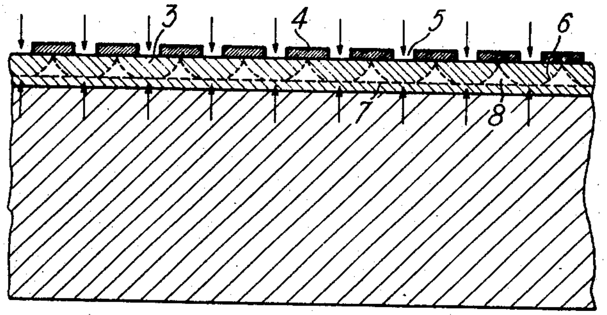
FIG. 2 shows the basic manufacturing process for a gridistor according to the invention.
Figure 3:
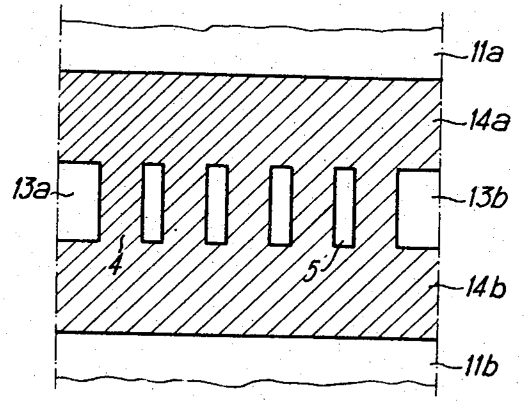
FIG. 3 is a plan view of the oxide mask used in FIG. 2.
Figure 4:
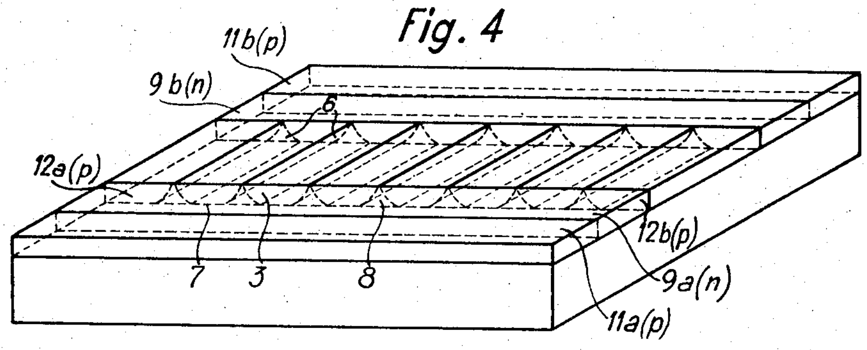
FIG. 4 is a perspective view showing the shape of the channels of a gridistor according to the invention.
Figure 5:
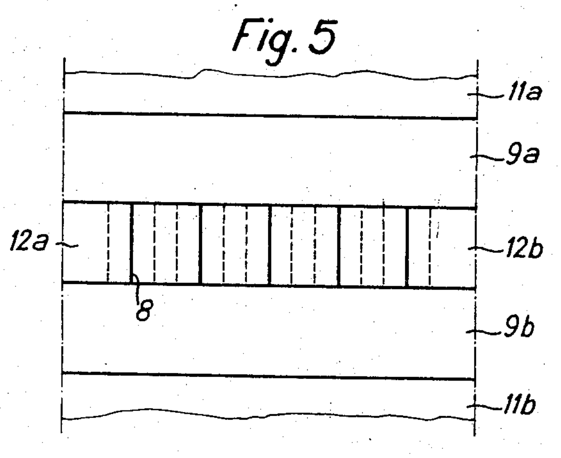
FIG. 5 is a plan view of part of a gridistor according to the invention.

A ladder type oxide mask whose rungs 4 and apertures 5 can be seen in FIG. 2 and some of which is shown in plan view in FIG. 3 is delimited by photogravure and formed on the exposed surface of the layer 1 in known manner. The width of rungs 4 is substantially equal to the thickness of the surface layer; for example this width may be given a value of 15$\mu$ for a 15$\mu$ thickness of layer 1; apertures 5 may have a width of 10$\mu$. the mask being formed, the layer has diffused into it a p-type impurity, for instance, gaseous boron in the form of the oxide $B_2O_3$ at a temperature of 1200° C. There is simultaneously a diffusion of $p^+$-type impurities contained in the base 2, and this latter diffusion progresses into the n-type layer 1, as the reference numeral 7 in FIG. 2 denotes, towards meeting the diffusion through the exposed surface of the layer 1. Since diffusion into a monocrystalline semiconductor proceeds omnidirectionally, the diffusion extends simultaneously widthwise and depthwise from the mask aperture 5, and the diffusion zones 3 starting from any two adjacent apertures 5 meet substantially in the centre of the oxide strip 4 between them when the p-type impurity has diffused through the remaining thickness of the layer. The result is a grid 3 comprising a large number of triangular cross-section channels 8 whose bases are contained in the plane 7 and whose other two surfaces are concave and in shape substantially resemble cylinder quadrants 6, as can be seen in section in FIG. 2, and in perspective in FIG. 4. Webs or bridges 14_a_, 14_b_ of the ladder mask shown in FIG. 3 ensure that there is no diffusion into two strips of the n-type layer 1 which are connected to the ends of the channels 8 and which extend therearound, as denoted by references *9a*, *9b* in FIGS. 4 and 5.

These strips, which form the source and drain regions of the device, are bounded, on the side opposite the channels 8, by regions 11*a*, 11*b* which, not having been protected against diffusion have the same type of conductivity as the grid. Similarly, those ends of the channel groups which can be used to form an assembly are clearly delimited by p-type framings 12*a*, 12*b*, visible in FIGS. 4 and 5, produced by diffusion through the apertures 13*a*, 13*b* visible in FIG. 3, in the oxide mask. The result of these accurate delimitations of the n-type regions is that the channels 8 and their terminal strips *9a*, *9b* have a very low electrostatic capacitance relatively to the grid 3.

Clearly, therefore, a single diffusion operation can provide, in the material of a semiconductive grid of one type of conductivity, a structure of the opposite type of conductivity and of much higher resistivity and comprising a large number of channels and their interconnecting terminal strips.

Juxtaposing the structures hereinbefore described helps to provide very advantageous systems. For instance, the channels can extend like a star between a central source electrode and a peripheral drain electrode. The patterns of the source and drain regions can be round or square or rectangular; by way of example a square pattern is shown in FIG. 6.

As can be seen therein, the surface of the source 16 and drain 17 (corresponding to *9a* and *9b* of FIG. 4) has been reduced to narrow annular square surfaces by the p-type regions 18, 19 (corresponding to 11*a* and 11*b* of FIG. 4) which extend round the inside and outside of the source and drain regions 16 and 17. The strips 16, 17 are provided by a known process with contact lines 20, 21 formed, for instance, by a metal, such as gold-antimony alloy, being vapour-coated through a fresh oxide mask pierced with appropriate apertures, whereafter heat treatment is given at a temperature above the melting point of the eutectic alloy between the gold and the particular semiconductor used—i.e., a temperature of some 400° C. in the case of germanium and silicon. Alternatively, this step can be preceded by slight doping with an impurity of the same type as the majority carriers—i.e., with an $n^+$-type impurity—inter alia with phosphorus, for instance, in the $P_2O_5$ form. The exposed surface 22 of the grid also in shape resembles a square ring. Preferably, the grid contact is on the back of the wafer but can equally well be on the surfaces 18 or 19 or 22.

Figure 6:
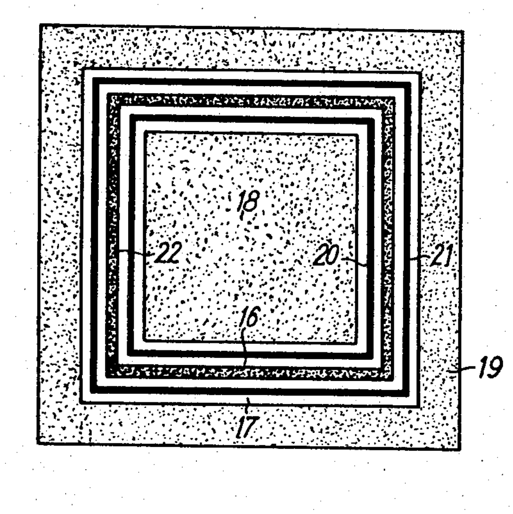
FIGS. 6 and 7 are overall views, in plan and in section through the central plane of the channels respectively, of a gridistor having a star-shaped grid according to the invention; and, FIG. 8 is an overall plan view of a four-electrode two-grid structure.
Figure 7:
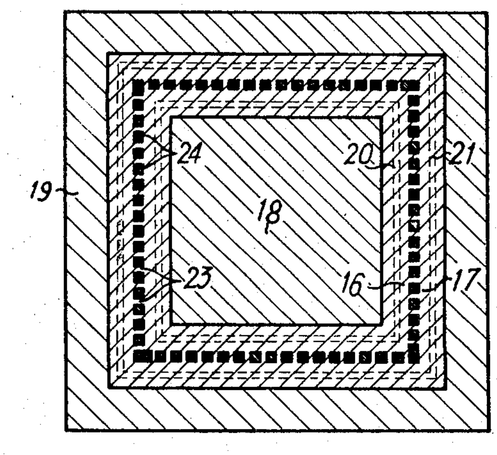

FIG. 7 is a section through the structure shown in FIG. 6 and substantially at the level of the centre of the channels, the same therefore being visible at a place 23 between the grid sections 24. Also visible are the terminal strips or bands 16, 17 containing dotted lines 20, 21 which correspond to the projection onto the cross-sectional plane of the source and drain electrodes. The p-type framings 18, 19 of the source and drain regions can also be seen.

Figure 8:
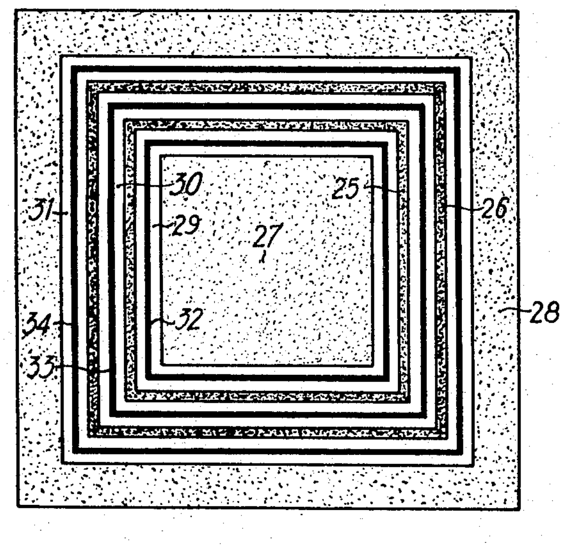

FIG. 8 is a plan view showing a double-grid structure wherein there can be seen annular surfaces 25, 26 of the two grids, p-type framings 27, 28, surfaces of n-type terminal bands 29, 30, 31 and their contact electrode strips 32, 33, 34. In this structure the two basic gridistors thus formed can operate in parallel, in which event the terminal electrodes of the system are formed the one by the contact electrode strip 33 of the band 30 and the other by the interconnected contact electrode strips 32, 34 of the bands 29, 31. If required, the two gridistors can operate in series, in which event the terminal electrodes of the system are formed by the contact electrode strips 32, 34 of the bands 29, 31 in series with the contact electrode strip 33 of the intermediate band 30. In all cases the electrode of the grids 25, 26 is of course on its own since the grids are interconnected by the $p^+$-type base 2.

The devices hereinbefore described are of use preferably for low-current work, as D.C. and A.C. amplifiers, oscillators, mixers and so on which can operate up to very high frequencies and with considerable output powers. In the latter case, the source and drain contacts are ohmic, while the grid mesh dimensions and the grid thickness are reduced very considerably, more particularly to the practical limits of photo-gravure techniques.

The main parameters and performances of a structure of a structure of the kind shown in FIGS. 6 and 7 are given hereinafter purely by way of information:

Material used: silicon, resistivity 0.1 ohm. cm.
Resistivity of n-type layer: 10 ohm. cms.
Kind of oxide mask used: $SiO_2$
Total superficial area of wafer: 1 mm.$^2$
Number of channels: approximately 400
Cross-section of each channel: approximately $6\mu^2$
Cut-off voltage: approximately—5 volts.
Anode saturation current: approximately 30 ma.
Transconductance gm.: approximately 200 ma./v.
Low-frequency input resistance: $>10$ MΩ
Low-frequency internal resistance: $>100$ kΩ
Dissipation: $>1$ Watt
Merit factor: approximately 250 MHz.
Maximum usuable frequency: $\geq 1,000$ MHz.

Of course the embodiments hereinbefore described and the uses mentioned are not limitative. More particularly, higher semiconductor resistivities of some 20 ohm. cms. can be used, inter alia in cases where operation at a fairly high voltage is required as in heavy-current switches. In this case, the ohmic terminal contacts are replaced preferably by contacts which inject majority carriers at the source and minority carriers at the drain. Similarly, variations can be made to the embodiments of the structure, more particularly as regards the arrangement of the channels—i.e., the pattern of the grid—and to the surface areas of the contact terminals without for that reason departing from the scope of the invention.

More precisely, the gate region must form a single piece in order to be biased in its whole by applying a bias voltage to the gate electrode in ohmic contact with the gate region. In the example disclosed the gate region in the shape of a plurality of flattened half-cylinders comprise half-cylinders which extend up to one another by their edge portions and up to the plane junction by their flattened rounded portion. In fact it is only necessary that each of the half-cylinder contacts the plane junction to form a single piece with the wafer substrate.

What I claim is:

1. A field-effect multichannel semiconductor device comprising: a semiconductor wafer of a given type of conductivity; a surface layer of the opposite type of conductivity on one of the faces of said wafer and forming a plane junction therewith; parallel spaced-apart strips of said opposite type conductivity in said surface layer forming, respectively, a source and a drain interconnected by a plurality of parallel channels of said opposite type of conductivity lying between said strips; and elongated inclusions of said given conductivity type embedding said channels and forming a gate junction therewith, the channels having a cross section in the shape of a triangle with a rectilinear base along said plane junction and with two concave curvilinear sides along said inclusions, the altitude of the triangle being substantially equal to one-half of the length of said base; said inclusions being adjacent and integral with each other at the free surface of said layer and extending therethrough to reach onto said plane junction; with said curvilinear sides of said elongated channels forming quarter-cylindrical borders.

2. A field-effect multichannel semiconductor device comprising: a semi-conductor wafer having a substrate region heavily doped in a given type of conductivity; a surface layer of the opposite type of conductivity on one of the faces of the wafer and forming a plane junction with said substrate region; said surface layer having a resistivity substantially greater than the resistivity of said substrate region; parallel spaced-apart strips of said opposite type conductivity in said surface layer forming, respectively, a source and a drain; a plurality of parallel channels interconnecting said source and drain and a corresponding plurality of elongated inclusions of said given conductivity type embedding said channels and forming a gate junction therewith, the channels having a cross section in the shape of a triangle with a rectilinear base along said plane junction, and having two concave curvilinear sides along said inclusions, the altitude of the triangle being substantially equal to one-half of the length of said base; said inclusions being adjacent and integral with each other at the outer surface of the surface layer and extending therethrough between said channels onto said plane junction where said inclusions are in ohmic contact with said substrate region.

3. A method for manufacturing a field-effect multichannel semiconductor device from a semiconductor wafer having a substrate region heavily doped in a given type of conductivity and a surface layer of the opposite type of conductivity on one of the faces of the wafer and forming a plane junction with said substrate region, said surface layer having a resistivity substantially greater than the resistivity of the substrate region, comprising the single step of diffusing a doping element of said given conductivity type into said surface layer through the apertures of a ladder type mask having rungs the width of which is substantially equal to the thickness of said layer, up to said junction which progresses concurrently into said superficial layer by exodiffusion of doping elements which are present in said heavily doped substrate region, whereby elongated inclusions of said given conductivity type and extend equally from said apertures in every direction into said layer and are adjacent each other at the free surface of said layer, said concurrent diffusions forming quarter-cylindrical boundaries in the thickness of said layer in ohmic contact with said substrate region in front of said apertures thereby providing parallel channels of said opposite conductivity type in said surface layer which are protected against diffusion by the webs of said ladder type mask.

References Cited

UNITED STATES PATENTS

| | | | |
|---|---|---|---|
| 2,930,950 | 3/1960 | Teszner | 317—235 |
| 2,952,804 | 9/1960 | Franke | 317—235 |
| 3,268,374 | 8/1966 | Anderson | 148—175 |

FOREIGN PATENTS

| | | |
|---|---|---|
| 912,114 | 12/1962 | Great Britain. |

JOHN W. HUCKERT, *Primary Examiner.*

R. SANDLER, *Assistant Examiner.*